United States Patent
Bauer et al.

[11] Patent Number: 5,882,037
[45] Date of Patent: Mar. 16, 1999

[54] VEHICLE INTERIOR TRIM PANEL

[75] Inventors: George Bauer, Heilbronn; Alban Bossenmaier, Gäufelden; Santiago Duenas Loza, Ammerbuch; Friedrich Reiter, Sindelfingen, all of Germany

[73] Assignee: Mercedes-Benz AG, Stuttgart, Germany

[21] Appl. No.: 808,844

[22] Filed: Feb. 28, 1997

[30] Foreign Application Priority Data

Feb. 28, 1996 [DE] Germany ............... 196 07 428.2

[51] Int. Cl.⁶ .................................................. B60R 21/02
[52] U.S. Cl. .................... 280/748; 180/90; 280/751; 280/752; 297/189; 297/70; 297/191
[58] Field of Search ................... 280/748, 752, 280/751, 750; 180/90; 296/189, 191, 70

[56] References Cited

U.S. PATENT DOCUMENTS

| | | | |
|---|---|---|---|
| 3,638,992 | 2/1972 | Forshee | 280/748 |
| 3,779,595 | 12/1973 | Suzuki et al. | 280/748 |
| 4,893,834 | 1/1990 | Honda et al. | |
| 5,201,544 | 4/1993 | Matano et al. | 280/752 |
| 5,431,442 | 7/1995 | Tomita et al. | |

FOREIGN PATENT DOCUMENTS

| | | |
|---|---|---|
| 2042220B2 | 3/1972 | Germany . |
| 2755970A1 | 6/1979 | Germany . |
| 3029913C2 | 2/1982 | Germany . |
| 4212704A1 | 10/1993 | Germany . |
| 50-2037 | 5/1973 | Japan . |
| 51-153932 | 6/1975 | Japan . |
| 1-9048 | 1/1989 | Japan ................... 280/750 |

OTHER PUBLICATIONS

Search Report, Apr. 21, 1997, Great Britain.

*Primary Examiner*—Eric D. Culbreth
*Attorney, Agent, or Firm*—Evenson, McKeown, Edwards & Lenahan, P.L.L.C.

[57] ABSTRACT

A plate- or shell-like plastic trim panel is provided with a convex structure configured such that, in the event of a horizontal compressive load running essentially in the longitudinal direction of the vehicle, the trim panel undergoes a controlled elastic and/or plastic deformation in the direction of the adjoining free space. This arrangement avoids risking injury to legs of a vehicle occupant resulting from uncontrolled bending or breaking of flat trim panels without such convex structure.

21 Claims, 2 Drawing Sheets

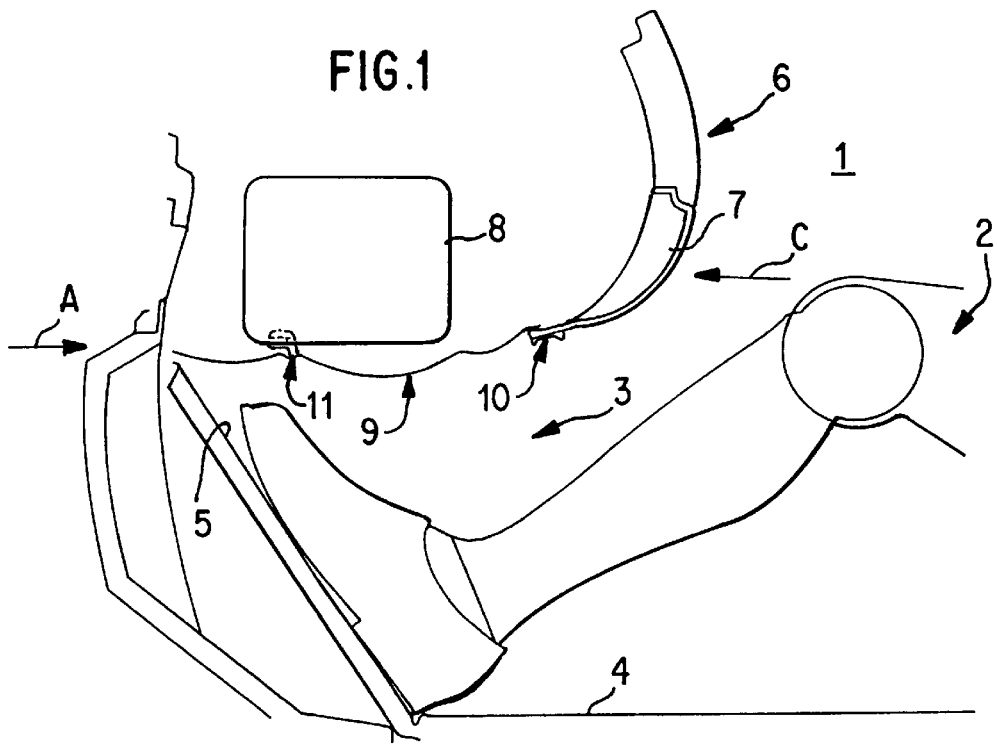
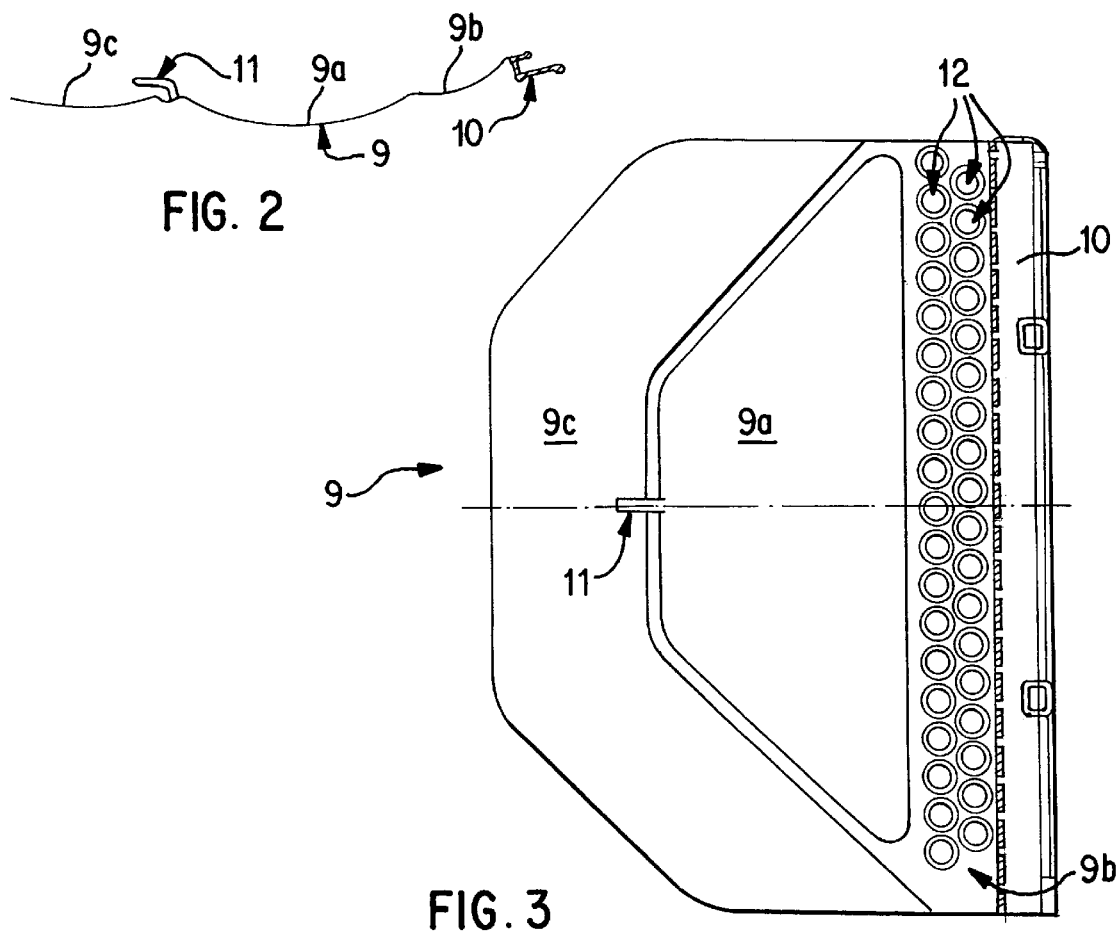

VEHICLE INTERIOR TRIM PANEL

BACKGROUND AND SUMMARY OF THE INVENTION

The invention relates to an interior trim panel made of plastic for a motor vehicle, which has a flat, plate- or shell-like shape and, in the installed state, is aligned at least essentially horizontally in the vehicle interior, a free space permitting the trim panel to move adjoining the trim panel on one side.

This application claims the priority of German patent application number 196 07 428.2-21, filed on Feb. 28, 1996 the disclosure of which is expressly incorporated by reference herein.

Interior trim panels made of plastic, in particular in the form of driver-side and passenger-side foot-well covers on a cockpit underside, are known. These plastic trim panels are aligned and fastened approximately horizontally to the underside of the cockpit and under severe impact loads on the motor vehicle are subject to load peaks which may lead to the trim panel breaking or tearing, as a result of which significant risks of injury to the legs or knees of a passenger may arise.

An object of the invention is to provide an interior trim panel of the type mentioned above which does not give rise to any risk of injury for vehicle occupants during impact loads on the motor vehicle.

This object is achieved according to preferred embodiments of the invention in that the plate- or shell-like shape of the trim panel is provided with a convex structure configured such that, in the event of a horizontal compressive load running essentially in the longitudinal direction of the vehicle, the trim panel undergoes a controlled elastic and/or plastic deformation in the direction of the adjoining free space. By means of the solution according to the invention, load peaks are avoided since a controlled deviation of the trim panel is permitted by the convex structure at an early stage when an impact load occurs. The invention thus proceeds from the recognition that the breakage or tearing of the known trim panels can actually be attributed to such load peaks. With the solution according to the invention, load peaks are avoided primarily in the event of impact loads which occur in the longitudinal direction of the vehicle, i.e. in the event of a frontal impact.

In a refinement of the invention, the convex structure is configured such that the trim panel also undergoes a controlled deformation in the direction of the free space in the event of horizontal compressive loads arising transverse to the longitudinal direction of the vehicle. As a result, the convex structure is also suitable for absorbing side-impact loads without the trim panel tearing or breaking. When the trim panel is used as a foot-well cover, the free space is advantageously the foot-well itself.

In a further refinement of the invention, the trim panel is designed at least in part as a lattice matrix. The trim panel is injection-molded in the form of a plastic grid or lattice, the lattice matrix being configured in accordance with the plate- or shell-like form.

In a further refinement of the invention, a plastic having an impact strength which remains constant over a wide temperature range, in particular a motor-vehicle bumper material, is provided. This plastic is particularly suitable for the configuration of the trim panel as a foot-well cover.

Other objects, advantages and novel features of the present invention will become apparent from the following detailed description of the invention when considered in conjunction with the accompanying drawings.

BRIEF DESCRIPTION OF THE DRAWINGS

FIG. 1 diagrammatically shows a longitudinal section of a passenger side of a motor car, the cockpit underside of which is provided with an exemplary embodiment of an interior trim panel according to the invention in the form of a foot-well cover, FIG. 2 shows an enlarged sectional representation of the foot-well cover according to the invention in accordance with FIG. 1, FIG. 3 shows a top view of the foot-well cover in accordance with FIG. 2.

DETAILED DESCRIPTION OF THE DRAWINGS

Figure 4:
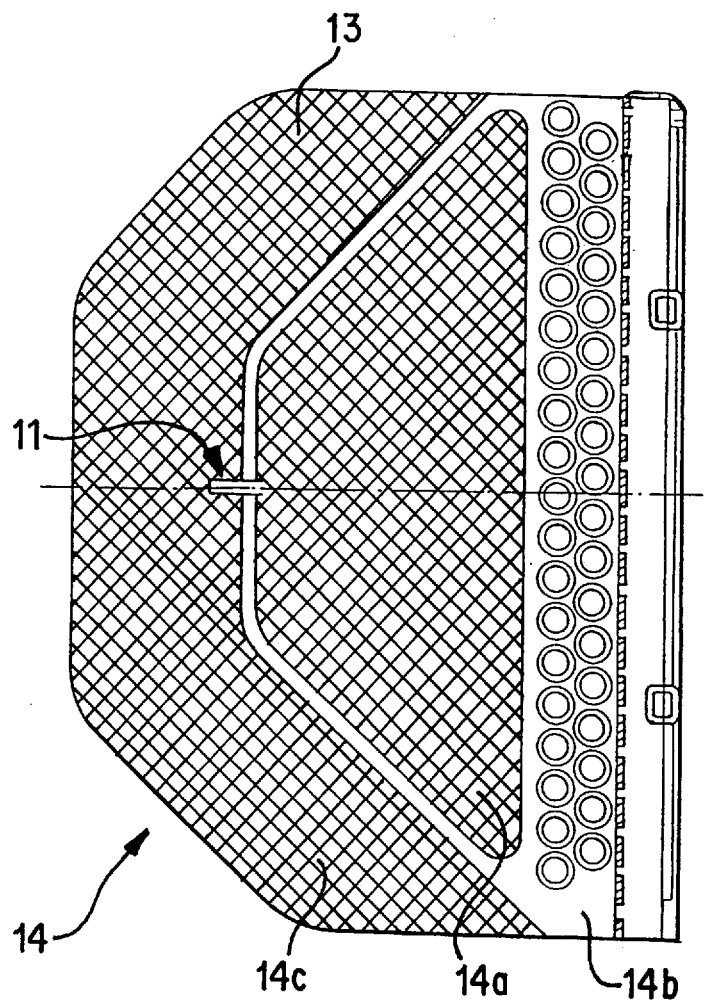
FIG. 4 shows a top view of a further foot-well cover in accordance with another exemplary embodiment according to the invention which is generally similar to FIG. 3.

A motor car has an interior (1), in which, in a manner known per se, a cockpit (6) is arranged beneath a windscreen. On a passenger side (2), the cockpit (6) is provided with a glove compartment (not depicted in more detail), beneath which a knee protector (7) is provided, which provides a certain protection for the knees of the passenger which are struck in arrow direction C in the event of a frontal impact of the motor car (load arrow A). A foot-well (3), which is delimited at the bottom by a vehicle base (4) and to the front by a front-side support (5), is provided in a manner known per se for the legs of the passenger (2).

At the top, the foot-well (3) is delimited by a foot-well cover (9) which constitutes an interior trim panel in accordance with the invention, is designed as a shell-like plastic component and is detachably connected to the cockpit shell on the one hand and to a heater housing (8), as a possible front-side support. The foot-well cover (9) is produced in one piece from a plastic material which has a sufficient impact strength over a wide temperature range. The foot-well cover (9) is additionally provided with a damping layer (not shown), which nestles against the foot-well cover (9) over the entire surface of the latter. The foot-well cover (9) is in this case fixed to the heater housing (8) by means of a fastening hook (11) shown schematically in the drawings. At its rear end—with regard to the direction of travel—the foot-well cover (9) is provided with an integrally molded fastening profile (10) which can be clipped onto a front-side edge of the cockpit shell.

The foot-well cover (9) in this exemplary embodiment has a convex structure (9a, 9b, 9c), the convexity being subdivided into a plurality of convex sections (9a, 9b, 9c), which all bulge downwards into the foot-well (3) in the illustrated embodiment. Embodiments are also contemplated with convex section bulge upwards. As can be seen from FIG. 3, the convex sections (9a and 9c) are additionally extended diagonally rearwards towards the side, the convexity in this section also running correspondingly obliquely. A reinforcement rib (not depicted in more detail), which extends over the entire width of the foot-well cover (9) in accordance with the convex sections and provides the foot-well cover (9) with sufficient strength, is provided between the convex sections (9a and 9c). The convex sections (9a and 9c) are aligned both transversely to the longitudinal direction of the vehicle and thus transversely to the impact direction (A) and also at least at an acute angle to a side-impact load, so that the foot-well cover (9) in the region of the convex sections (9a, 9b, 9c), in the event of a frontal-impact load (arrow direction A), immediately deviates towards the foot-well (3) downwards or upwards in the region of the convex sections without receiving load peaks. By means of the additional convexity at an acute angle or at right-angles to the transverse direction of the vehicle and thus to any side-impact load, the foot-well cover (9) also deviates downwards in good time in the event of an impact load of this kind without breaking because of corresponding load peaks. The series of perforations (12) illustrated in FIG. 3 are provided for supplying air into the foot-well (3), these series of perforations (12) also being a curved section in accordance with the convexity of the convex section (9b).

The exemplary embodiment in accordance with FIG. 4 also represents a foot-well cover (14), which essentially corresponds in shape to the foot-well cover (9) described above. In longitudinal section, the foot-well cover (14) is identical to the foot-well cover (9) in accordance with FIG. 2. The only difference in this exemplary embodiment is that the foot-well cover (14) is configured in a grid-like manner as a lattice matrix (13) in the region of its convex sections (14a and 14c). This lattice matrix (13) is injection-molded from plastic, so that the foot-well cover (14) also constitutes a one-piece plastic component. The lattice matrix (13) further improves the behavior of the foot-well cover (14) in the event of impact loads and additionally reduces the risk of the convex sections (14a, 14b and 14c) breaking.

Both foot-well covers (9 and 14) illustrated (FIGS. 1 to 4) serve to cover the foot-well on the passenger side or also on the driver side over a large area at the top and thus to close the underside of the cockpit. In their mounted state (FIG. 1), the foot-well covers (9 and 14) are aligned approximately horizontally in the interior, so that, in the event of frontal-impact or side-impact loads, they are loaded directly in their shell plane. Without the convexity described above, in the event of a corresponding impact load and a resulting compression, the foot-well covers would buckle in an undirected manner either upwards or downwards, with a considerable risk of breakage occurring due to the extreme compression peaks. Even in the normal quiescent state, the convex structure provides the foot-well cover (9) with a direction in which the latter deviates in the event of a corresponding impact load. Load peaks which could lead to breakage are thereby avoided. The inventive idea could also be implemented in accordance with other contemplated embodiments of the invention on other interior trim panels, which are likewise aligned in the plane of a possible impact load and would push together in an uncontrolled manner in the event of an impact load.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A trim panel assembly for a vehicle passenger body member accommodating space, comprising:
    a trim panel plate which in use extends substantially horizontally in a vehicle interior space, said trim panel plate forming a boundary for the vehicle passenger body member accommodating space, said trim panel plate being connectible at one side to a vehicle support member which undergoes movements into said interior space in a horizontal direction in response to vehicle collision forces,
    wherein said trim panel plate is provided with a convex structure facilitating controlled deformation of said trim panel plate, and
    wherein the convex structure moves in a direction of the vehicle passenger body member accommodating space independently of passenger impact forces on said trim panel plate,
    whereby uncontrolled breaking or tearing of said trim panel plate and consequent injury to a vehicle passenger are minimized.

2. A trim panel assembly according to claim 1, wherein the trim panel plate is designed at least in part as a lattice matrix.

3. A trim panel assembly according to claim 1, wherein the trim panel plate is designed as a cover for a foot-well region.

4. A trim panel assembly according to claim 1, further comprising a knee protector and a forward foot-well wall,
    said trim panel plate having a front end and a rear end,
    wherein said knee protector is connected to said rear end of said trim panel plate,
    whereby a passenger foot-well is formed below the trim panel plate and adjacent to the forward foot-well, and
    wherein said trim panel plate is configured to extend above the passenger foot-well between the knee protector and the forward foot-well wall of a vehicle.

5. A trim panel assembly according to claim 4, wherein said trim panel plate includes a plurality of downwardly bulging convex sections along its longitudinal length between the forward foot-well wall and the knee protector.

6. A trim panel assembly according to claim, 4 wherein said trim panel plate includes a plurality of downwardly bulging convex sections along its longitudinal length extending between the forward foot-well wall and the knee protector.

7. A trim panel assembly according to claim wherein the trim panel plate is designed at least in part as a lattice matrix.

8. A method of making a trim panel assembly for a vehicle passenger body member accommodating space for a motor vehicle, comprising the acts of:
    (A) forming a trim panel plate of plastic, wherein said trim panel plate is connectible at one side to a vehicle support member which undergoes movements into an interior space in a horizontal direction in response to vehicle collision forces,
        wherein forming said trim panel plate includes providing a convex structure facilitating controlled deformation of said trim panel plate, and
    (B) placing said trim panel plate in a position in the motor vehicle so as to delimit the vehicle passenger body member accommodating space such that the convex structure moves in a direction of the vehicle passenger body member accommodating space independently of passenger impact forces on said trim panel plate,
        whereby uncontrolled breaking or tearing of said trim panel and consequent injury to a vehicle passenger are minimized.

9. A method according to claim 8, wherein said forming includes molding said trim panel plate with a plurality of downwardly bulging convex sections.

10. A trim panel assembly for a vehicle passenger body member accommodating space, comprising:
    a knee protector,
    a front-side support, and
    a trim panel plate, said trim panel plate having a front end and a rear end,
    wherein said knee protector is connected to said rear end of said trim panel plate and said front-side support is connected to said front end of said trim panel plate, wherein said trim panel plate, in use, extends substantially horizontally in a vehicle interior space and forms a boundary for the vehicle passenger body member accommodating space, said trim panel plate being connectible at one side to a vehicle support member which undergoes movements into said interior space in a horizontal direction in response to vehicle collision forces, wherein said trim panel plate is provided with a convex structure facilitating controlled deformation of said trim panel, and wherein the convex structure moves in a direction of the vehicle passenger body member accommodating space in response to vehicle collision forces on said one side and independently of passenger impact forces on said trim panel plate, whereby uncontrolled breaking or tearing of said trim panel and consequent injury to a vehicle passenger are minimized.

11. A trim panel assembly according to claim 10, wherein said trim panel plate includes a plurality of downwardly bulging convex sections along its longitudinal length between a forward foot-well wall and the knee protector.

12. A trim panel assembly according to claim 10, wherein said trim panel plate is designed at least in part as a lattice matrix.

13. A trim panel assembly according to claim 10, wherein said trim panel plate is designed as a cover for a foot-well region.

14. A trim panel assembly according to claim 10, wherein the trim panel plate is made of a plastic material having an impact strength which remains constant.

15. A trim panel assembly according to claim 10, wherein the convex structure is configured such that said trim panel plate also undergoes a controlled deformation in the direction of the vehicle passenger body member accommodating space in the event of horizontal compressive loads arising transverse to the longitudinal direction of the vehicle.

16. A trim panel assembly according to claim 15, wherein said trim panel plate includes a plurality of downwardly bulging convex sections along its longitudinal length between a forward foot-well wall and the knee protector.

17. A trim panel assembly according to claim 15, wherein said trim panel plate is designed at least in part as a lattice matrix.

18. A trim panel assembly according to claim 15, wherein the trim panel plate is made of a plastic material having an impact strength which remains constant.

19. A trim panel assembly according to claim 15, wherein said trim panel plate is designed as a cover for a foot-well region.

20. A trim panel assembly according to claim 19, wherein the material is injection-molded.

21. A trim panel assembly according to claim 20, wherein the material is injection molded.

* * * * *